No. 621,436. Patented Mar. 21, 1899.
H. W. STRUSS.
POWER TRANSMITTING DEVICE.
(Application filed May 5, 1898.)
(No Model.)
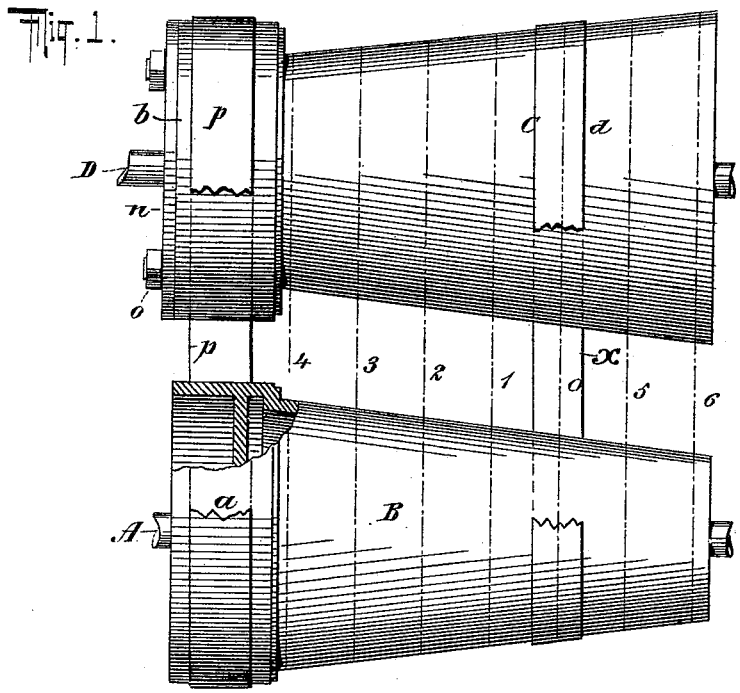
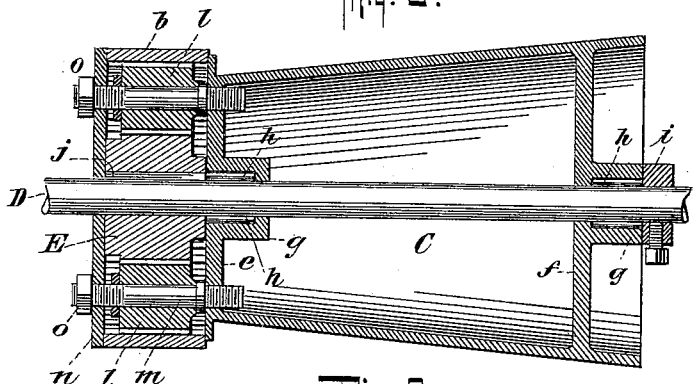
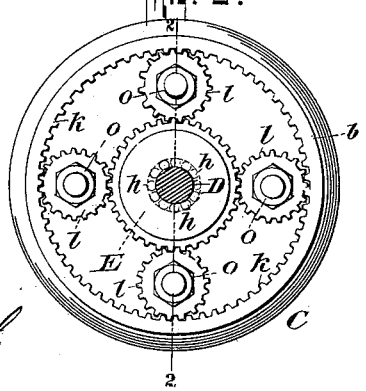
WITNESSES:
INVENTOR
Henry W. Struss
BY Briesen & Knauth
ATTORNEYS
THE NORRIS PETERS CO., PHOTO-LITHO., WASHINGTON, D. C.

UNITED STATES PATENT OFFICE.

HENRY W. STRUSS, OF NEW YORK, N. Y.

POWER-TRANSMITTING DEVICE.

SPECIFICATION forming part of Letters Patent No. 621,436, dated March 21, 1899.

Application filed May 5, 1898. Serial No. 679,796. (No model.)

*To all whom it may concern:*

Be it known that I, HENRY W. STRUSS, of the borough of Manhattan, city of New York, county and State of New York, have invented certain new and useful Improvements in Power-Transmitting Devices, of which the following is a specification.

My invention relates to a power-transmitting device or driving mechanism which is more particularly adapted for use in motor-vehicles, but which obviously may be employed wherever such mechanism may be found useful.

The object of my invention is to provide a simple, cheap, and efficient mechanism whereby the speed and direction of rotation of the traction-wheels of a motor-vehicle, for instance, may be changed at will without changing the speed or direction of rotation of the main or motor shaft or whereby the movement of the traction-wheels may be arrested and the vehicle stopped without arresting the rotation of the motor-shaft.

A further object of my invention is to provide a device by the use of which no shock or jar will be imparted to the mechanism and the occupants of the vehicle when the various changes in speed or direction of movement are brought about or when the power is first applied to the mechanism.

To these ends my invention consists in the arrangement and combination of parts hereinafter described and claimed.

In the accompanying drawings, Figure 1 is a plan view, with portions broken away, of a sufficient number of parts to illustrate one form of power-transmitting mechanism embodying my invention. Fig. 2 is a central longitudinal sectional detail view of the driven drum or pulley, said section being taken on the line 2 2 of Fig. 3; and Fig. 3 is an end view of the same, looking in the direction of the arrow in Fig. 2.

The shaft A shown in the accompanying drawings preferably is what I term the "main driving-shaft," which may either be directly operated by the motor or connected with it by any suitable intermediate mechanism. To this shaft A a cone pulley or drum B is fixed, so as to rotate therewith, and the pulley is provided, in addition to a conical belt-supporting face, with a cylindrical belt-supporting face $a$, which is shown to extend from the base of the cone. A second pulley or drum C coöperates with the pulley B and is connected therewith by belts in a manner which will hereinafter appear. The pulley C, which is illustrated in detail in Figs. 2 and 3, is preferably of the same size and contour as the pulley B, except that the cylindrical pulley-section $b$ is adjacent to the head of the cone instead of at the base thereof.

The conical section $d$ of the pulley C and the cylindrical section $b$ thereof are, in fact, two separate and independently-movable pulleys. The conical pulley $d$ is provided with heads or spiders $e$ $f$, each of which may be provided with a bearing $g$, in which are contained antifriction-rollers $h$, that are adapted to contact with the shaft D, which I term the "driven" shaft and which may be connected to the traction-wheels or other parts to be operated. A collar $i$ may be secured to the shaft by means of a set-screw to maintain the rollers in place in their bearing in the head $f$, while a gear-wheel E maintains the rollers in place in the bearing in the head $e$. The gear E is a driven gear which is connected to rotate with the shaft D by means of a feather $j$ or otherwise.

The cylindrical pulley $b$ is provided with an internal gear-face $k$, which is adapted to engage a series of idlers $l$, the shaft $m$ of each of which is supported at one end by the head $e$ of the conical pulley $d$ and at the other by the head or plate $n$, which is supported by the shaft D and is prevented from lateral movement by the nuts $o$. It will be observed that by these means the gearing is housed and a firm support afforded for the shafts of the idlers.

In carrying my invention into practice a belt $p$ connects the cylindrical portion $a$ of the driving-pulley B to the cylindrical pulley $b$, though these parts may be otherwise connected, as by means of a chain or gear, and motion may be thus communicated to the idlers $l$ and from the idlers to the gear E, which transmits motion to the shaft D and by the shaft to the traction-wheels or other part to be moved. Another belt $x$ connects the conical portion of the pulley B with the pulley $d$, and the speed and even the direction of rotation of the shaft D is determined by the location of this belt x on the pulleys. To illustrate this, let it be assumed that the pulley B is driven at the rate of six hundred revolutions a minute, that the diameter of the gear $k$ is eight inches, that the diameter of each of the idlers $l$ is two inches, while the diameter of the gear E is four inches. This being the case, we will assume that when the belt is in the position indicated by the line O the normal is obtained, and that the drum C will be driven at a speed of four hundred revolutions a minute, and that the speed at which the idlers $l$ are moved around with the drum C will be such with relation to the speed imparted to the idlers by the gear $k$ that they are ineffective to transmit motion to the gear E, and consequently to the traction-wheels, so that while the motor is running at full speed the vehicle will not be moved. As the belt is shifted to any of the positions indicated by the lines 1, 2, 3, and 4 motion is transmitted to the driven shaft and the traction-wheels connected therewith, because of the higher rate of speed transmitted to the drum C, the highest rate of speed being attained when the belt is shifted to the position indicated by the line 4. When it is desired to reverse the direction of movement of the vehicles, it is merely necessary to shift the belt to the opposite side of the normal position or to one of the positions indicated by the lines 5 6, when the pulley C and the idlers $l$ will be moved around at a slower rate of speed than the normal, or at the rate of, say, three hundred revolutions to the minute, and the shaft D will be rotated in the opposite direction. This rotation of the shaft in an opposite direction from that first described is due to the fact that the movement of the drum C, which carries the idlers $l$, is traveling at a rate of speed—say three hundred revolutions at the line 6—which will permit the gear $k$ to transmit a rotary motion to the idlers, which motion is in turn transmitted to the driven shaft D and to the traction-wheels connected therewith.

It will be observed that by my invention I am enabled to provide a simple, cheap, and efficient differential driving mechanism in which the driven part can be either stopped or rotated at various rates of speed in either direction at will without changing the speed of the motor.

It will be obvious that instead of employing the shaft A as the power-transmitting or motor shaft power may be applied to the shaft D, when the shaft A will become the driven shaft.

Having described my invention, what I claim, and desire to secure by Letters Patent, is—

1. In a power-transmitting device, the combination of a driving-shaft, a cone-pulley mounted on said shaft and having a cylindrical pulley-section formed thereon, a driven shaft and an oppositely-disposed cone-pulley loosely mounted on said driven shaft, a belt connecting the said cone-pulleys, a plurality of idlers carried directly by and adapted to be moved around with one of said pulleys, an internal driving-gear which has a belt-pulley formed on its periphery, said internal gear being adapted to surround and transmit motion to said idlers, a driven gear fixed upon one of said shafts and adapted to be operated by the idlers, and a belt operatively connecting the driving-gear and the cylindrical pulley-section of the cone-pulley coöperating therewith.

2. In a power-transmitting device, the combination of a driving-shaft, a cone-pulley fixed upon said driving-shaft and having a cylindrical pulley-section formed integral therewith, a driven shaft and an oppositely-disposed cone-pulley loosely mounted on said driven shaft, roller-bearings carried by said driven pulley, a belt connecting the said cone-pulleys, a plurality of idlers carried by spindles projecting from the head of said driven pulley, an internal driving-gear in the nature of a ring supported upon and meshing with said idlers, the periphery of said gear forming a belt-supporting face, a driven gear fixed upon the driven shaft and adapted to be operated by the idlers, and a belt connecting the pulley-face of the driving-gear and the cylindrical section of the cone-pulley coöperating therewith.

HENRY W. STRUSS.

Witnesses:
CHARLES E. SMITH,
GEO. E. MORSE.